Feb. 19, 1929. 1,702,976
C. W. MOORE
SELF TESTING SEAL
Filed Nov. 29, 1924
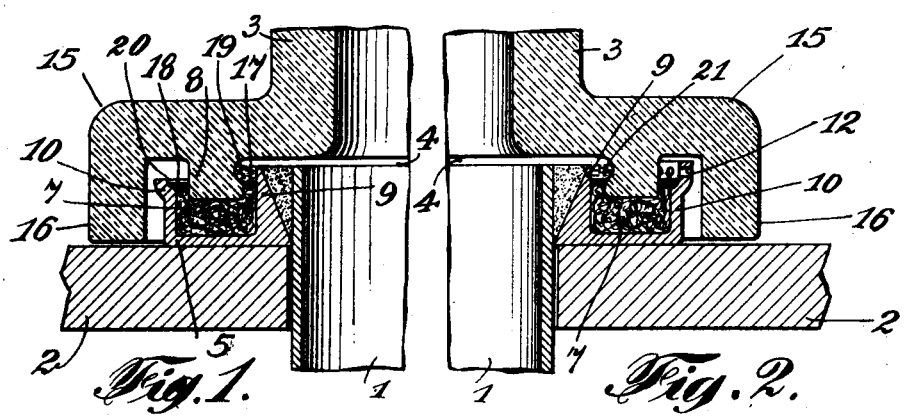
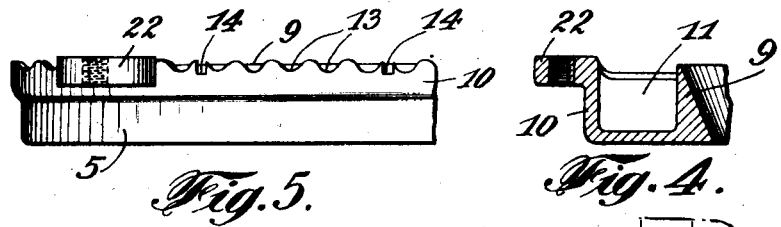
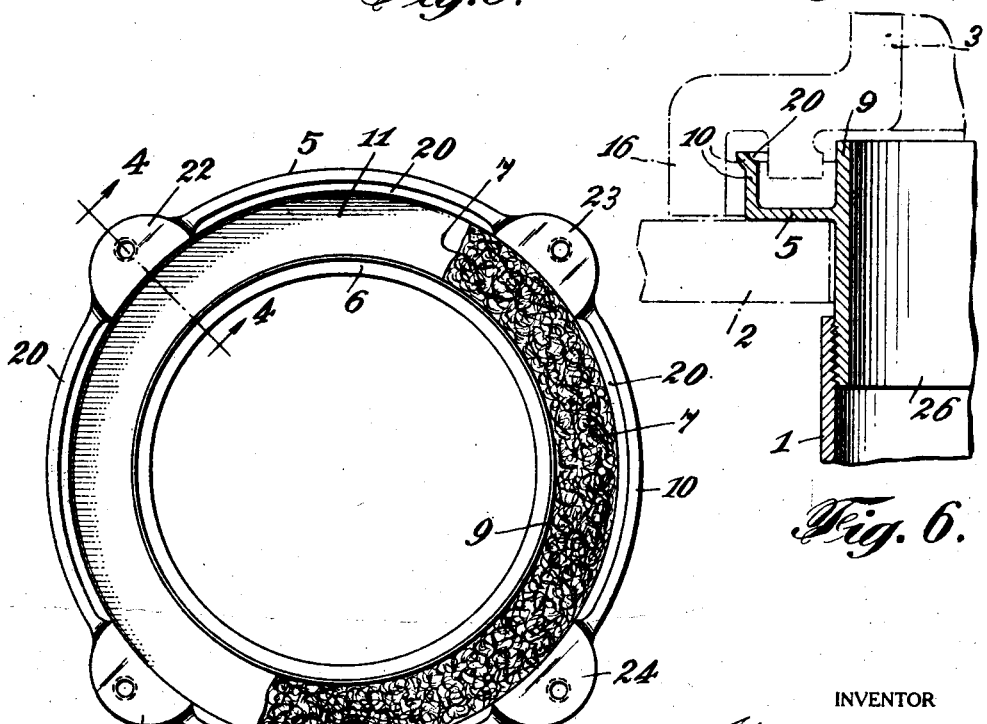
INVENTOR
Charles W. Moore
BY
ATTORNEY Patented Feb. 19, 1929.

1,702,976

UNITED STATES PATENT OFFICE.

CHARLES W. MOORE, OF NEW YORK, N. Y.

SELF-TESTING SEAL.

Application filed November 29, 1924. Serial No. 752,922.

This invention pertains to an improved sealing means employed to prevent the passage of a liquid or a gas beyond a designated point or points, such as at pipe joints. In particular the invention forms a compound or complete seal and is so constructed that in the event of a break in the seal there will be an immediate indication of such break thereby making it possible to have repairs made before material damage has been done.

My improved sealing means may be employed with any apparatus in which it is desired to prevent the passage of water or a gas beyond a particular point and the constructional elements of the seal may be modified to meet any desired use. One of the particular uses where my improved seal has operated with material success is in sealing a toilet bowl to a drain pipe. The seal is so constructed that it will prevent the passage of water and of any gases that may be in the drain pipe. In this particular use I have so constructed the seal that there will be an indication should the seal become broken for any reason. Such a self testing seal or self indicating seal efficiently meet the requirements of boards or health and of health officers.

My improved and novel seal will be herein set forth and described as it is employed to seal a toilet bowl to a drain pipe. It is to be understood however that the seal may be satisfactorily employed for various other uses and such other uses are considered to be within the scope of this invention when the sealing results are substantially the same when using some or all of the elements herein set forth.

The main object of my invention is to provide a novel self testing or self indicating seal for joining together two parts of apparatus so that a liquid or gas passing therethrough will not escape at the joint, and in case a leak develops that there will be an immediate indication thereof.

It is also an object of the invention to provide such a novel and efficient seal to prevent the passage of a liquid or gas therethrough and to so form the seal as to have more than one form of sealing means operating to obstruct leakage of the liquid or gas, one of said seals being a liquid seal.

It is a further object of the invention to provide an improved seal that is simple in operation, that is manufactured at low costs, and that will maintain its sealing properties for substantially an indefinite period of time.

Another object of my invention is to provide such a novel self testing or self indicating seal that is sufficiently flexible to compensate for various pressures and movements thus making in addition to its self testing qualities, a self adjusting seal.

It is a further and important object of this invention to provide this novel seal in such form that there will always be a material quantity of liquid in the liquid seal so that upon a break developing in the other component parts of the seal there will be a sufficient quantity of the liquid to automatically pass to the exterior of the seal to give proper indication of the leak thereby eliminating the possibility of gas leaking for any material length of time.

A particular object of my invention is to furnish an improved and efficient self testing and compensating seal especially adapted to seal a toilet bowl to a drain pipe.

Other objects and advantages of the invention will become apparent when the detailed description set forth below is read.

The preferred embodiment of my invention is illustrated in the accompanying drawings wherein:

Fig. 1 is a vertical sectional view illustrating the elements of my improved seal.

Fig. 2 is a view similar to Fig. 1 and illustrating a modified form of one of the elements of the seal.

Fig. 3 is a top plan view of a flange element of the seal having mounted therein a resilient material in the form of washer.

Fig. 4 is a sectional view taken on the lines 4—4 of Fig. 3.

Fig. 5 is a partial elevational view of the flange element of the seal illustrating two overflow means; and Fig. 6 is a partial vertical sectional view of a modified form of the flange element of my improved seal.

Referring now to these drawings and especially to Figs. 1 and 2 a drain pipe or conduit 1 is shown as passing through suitable floor boards 2. A second conduit 3 having its opening in alignment with the first conduit 1 is shown as being positioned slightly spaced apart from conduit 1 thus forming an opening 4. This conduit 3 in this particular use of my improved seal constitutes the base of a toilet bowl.

My improved means for joining these two conduits together in a manner to prevent leakage of the liquid or water and of any gases in the conduit at the joint, is shown in the most approved forms in these Figs. 1 and 2.

It has been found from experience that the most simple manner of obtaining a satisfactory seal at a minimum cost is to provide a suitable flange element or member 5 which rests on the floor boards 2 as illustrated in Fig. 1 and is affixed to the drain pipe or conduit 1 in any satisfactory manner. The flange 5 may be made of any suitable material such as cast iron or pressed steel. In this instance the mode of affixing the flange to the drain pipe is obtained by forming a tapered portion 6 on the inner surface of the flange and filling the space formed by this tapered portion and the drain pipe with solder. The flange is constructed to receive a suitable impregnated flexible material 7 such as a piece of felt strip or member which is preferably formed to lay within a portion of the flange. This resilient material receives a projection 8 in the form of a ring usually formed integral with the conduit 3 and thereby providing one member for assisting in sealing the joint of the two conduits against leakage of the liquid or gas passing through the conduits.

One of the main features of my improved seal is to provide such a seal construction as will indicate immediately when there is a break in the sealing means thus preventing non-observable leakage of dangerous gases. It will be noted from the preferred use of my improved seal as shown in the drawings that the liquid passing through the conduits does not normally flow against the seal. With such construction it is desirable to provide a seal that will permit immediate indication of a breaking down of the seal. The accomplishment of this result may be provided in many different ways but I have herein shown one form of seal which has been very successfully employed. The preferred seal for successfully accomplishing this self testing or self indicating construction is herein illustrated and will now be described in detail.

The flange 5 is constructed to have an inner rim 9 and an outer rim 10. These rims are so shaped that they form between them a channel 11, (Fig. 4) for receiving the resilient material 7. These rims are constructed of such height as to extend above the resilient material. It is desired however that the outer rim 10 shall be provided with suitable overflow outlets which are positioned below the height of the inner rim thus permitting any liquid which passes through opening 4 to pass to the exterior of the flange when the seal is broken and in such instance this liquid will flow out onto the floor boards 2 thereby indicating that the seal has been broken. When this indication is noted repairs may be made immediately so that no material damage will result from the breaking of the seal and so that no material amount of dangerous gases will escape. The overflow outlet indicating idea may be accomplished in several different ways all of which have proven successful by experience. In Fig. 1, I have reduced the height of the outer rim 10 so that it is less than the height of the inner rim 9, thus any liquid or water which would pass to the outer rim by reason of the breaking of the seal would automatically flow to the exterior of the flange and from there out onto the floor boards thereby making the seal a self testing or self indicating seal. From the constructional point of view the foregoing arrangement of having the outer rim lower than the inner rim, is found to advantageously permit the production of a flange at minimum cost.

The modified constructions of the flange which provide suitable overflow outlets are illustrated in Figs. 2 and 5. In Fig. 2 the outer rim 10 is of equal height with the inner rim 9 and is provided with suitable overflow outlets in the form of holes 12 which are at a position of less height from the base of the flange than the top of the inner rim 9. In Fig. 5 I have provided the top of the outer rim 10 with a wavey construction so that the depressions 13 of this construction are of less height than the top of the inner rim. Another form of overflow outlet is shown by slots 14 having the base of the slots positioned lower than the top of the inner rim. It is to be understood that either or both of these overflow outlet constructions may be employed in a single flange.

A proper and satisfactory complete seal which will last substantially for the life of the connection between two conduits may be formed in several different ways, but I have found that by impregnating the resilient material or felt strip 7 with a suitable non-evaporable grease that a satisfactory tight seal of long life is produced.

In the formation of the seal illustrated in Figs. 1 and 2 I have provided the second conduit 3 or the foot of the toilet bowl with a flange portion 15 having a downwardly extending portion 16 which covers over the seal but which when the conduits are in proper position does not engage the floor boards 2, and in this construction the projection ring 8 is formed within the flange portion 15. The width of the projection 8 is preferably made less than the width of the felt strip 7 so that as the projection 8 passes into its normal position it will press into the felt causing certain portions of the felt to bulge up around the edges of the ring or projection 8. By reason of the felt being a resilient material the bowl will automatically adjust itself in position. It will be noted that the base of projection 8, when in normal position, will be positioned below the tops of the rims 9 and 10 and below the over-flow outlets.

When placing the bowl in position and by reason of the weight of the bowl or by forcing the projection ring 8 into the felt, a certain amount of the grease which acts as impregnating agent will be forced out of the felt strip and will form an inner grease seal 17 and an outer grease seal 18. These two seals along with the sealing function of the impregnated resilient material and with the liquid or water 19 which passes through opening 4 there will be formed a complete or compound annular and radial seal against the leakage of the liquid passing through the conduits. It is desirable to obtain as much effectiveness of the grease seals as possible and I have therefore constructed a groove 20 in the outer rim so that the width of the outer grease seal 18 is materially increased. It is to be understood that any other desirable means for obtaining this end may be employed as long as the full effect of the extruded grease to act as a seal is obtained.

Referring now to Fig. 3, it will be noted that the flange 5 is provided with ears 22, 23 and 24, and 25 which are adapted to affix the flange to the floor boards 2 and to fasten the conduit or bowl 3 in a firm relation to the conduit 1, this may be accomplished by placing suitable screws down through the flange portion 15 and into suitable openings in the ears of the flange 5 and thus the ring projection 8 may be forced down into the felt strip 7 to any desired extent thus obtaining sufficiently large grease seals. It will also be noted in referring to Fig. 3 that the grooves 20 which permit a larger outer grease seal to be formed that these grooves extend between any two of the ears. It will be understood that if desired the groove may be complete throughout the circumference of the flange.

It will be noted from Figs. 1 to 4 inclusive that the flange 5 is constructed in a very simple form, and for other purposes this flange may be constructed with a skirt 26 (see Fig. 6) which is adapted to extend through the floor boards 2 and to receive conduit 1 thereon by means of screw thread engagement.

It will be seen from the foregoing description that I have provided a satisfactory complete or compound seal which is self testing or self indicating thereby meeting the requirements of boards of health and special requirements of health officers. It is known that self testing seals are not required in all States but the advantages of this type of seal are very material to prevent dangerous gases from escaping and for preventing material damage to property. It will also be seen that with my improved seal there are four separate and distinct seal elements which go to make up the complete seal and which operate with a suitable overflow outlet providing a complete self testing or self indicating seal that is of material advantage in maintaining health and in maintaining the proper condition of property. Also the simplicity of construction of this improved new seal permits larger manufacture at a much lower cost than has heretofore been possible in accomplishing the same results thereby making it possible for a larger number of persons to be properly protected from the health standpoint.

It will be understood that while I have herein described in detail a particular embodiment of my invention for purposes of full disclosures, and some detailed features which I am specifically claiming for a special advantage, many changes and modifications may be made in the particular construction and arrangement of parts without departing from the broad scope of my invention which is outlined in the sub-joined claim.

What I claim is:—

A pipe connection comprising opposing members, a flange fastened to one of said members, and a sealing means; said flange having an inner rim tapered on the inside thereof to provide space between it and said member for a suitable fastening means, said flange having an outer rim spaced apart from said inner rim thereby forming a channel between said rims for receiving said sealing means, said outer rim being substantially vertical and ending at a height below the top of said inner rim, thereby to permit water normally held against said inner rim to flow to the outside of said outer rim when the sealing means within said channel becomes broken, said outer rim being provided at intervals with integral ears which are of relatively short widths and of relatively small thicknesses, said ears extending outwardly from said outer rim, and adapted to receive the top bowl attaching means, the height of the top surfaces of said ears being level with or higher than the top of said inner rim and being of small thickness thereby providing space below said ears for the ends of the fastening means.

This specification signed this 26th day of November, 1924.

CHARLES W. MOORE.